US007821152B1

(12) United States Patent
Young

(10) Patent No.: US 7,821,152 B1
(45) Date of Patent: Oct. 26, 2010

(54) SYSTEM FOR GENERATING HEAT USING A WIND TUNNEL

(76) Inventor: Wayne Davis Young, 10912 Renfroe Rd., Alpine, AL (US) 35014

( * ) Notice: Subject to any disclaimer, the term of this patent is extended or adjusted under 35 U.S.C. 154(b) by 467 days.

(21) Appl. No.: 12/074,207

(22) Filed: Mar. 3, 2008

Related U.S. Application Data

(63) Continuation-in-part of application No. 11/361,404, filed on Feb. 24, 2006, now abandoned.

(51) Int. Cl.
*F03D 9/00* (2006.01)
(52) U.S. Cl. .......................................... 290/55; 290/44
(58) Field of Classification Search ............ 290/43, 290/44, 54, 55; 62/304, 314
See application file for complete search history.

(56) References Cited

U.S. PATENT DOCUMENTS

| 3,111,843 | A | | 11/1963 | Fredette | |
|---|---|---|---|---|---|
| 3,621,930 | A | | 11/1971 | Dutchak | |
| 4,016,725 | A | | 4/1977 | Fiss | |
| 4,087,196 | A | * | 5/1978 | Kronmiller | 415/4.5 |
| 4,087,927 | A | * | 5/1978 | Basmajian | 434/389 |
| 4,159,426 | A | | 6/1979 | Staton | |
| 4,805,329 | A | | 2/1989 | Tsai | |
| 4,835,977 | A | * | 6/1989 | Haglund et al. | 62/89 |
| 5,734,202 | A | * | 3/1998 | Shuler | 290/55 |
| 6,041,596 | A | | 3/2000 | Royer | |
| 6,293,121 | B1 | * | 9/2001 | Labrador | 62/304 |
| 6,647,717 | B2 | | 11/2003 | Zaslavsky et al. | |
| 7,683,501 | B2 | * | 3/2010 | Berenda et al. | 290/55 |

* cited by examiner

*Primary Examiner*—Nicholas Ponomarenko
(74) *Attorney, Agent, or Firm*—George L. Williamson

(57) ABSTRACT

A system for heating air in an enclosed air duct or wind tunnel which comprises a series of wind producing devices which are powered by conventional electrical power sources and a series of wind collecting devices which collect the previously generated wind to generate electricity which electricity is transmitted to a series of heat exchangers. Additionally, wind collecting apparatuses, e.g., a windmill, are provided outside of the air duct to collect wind on the outside of the air duct to drive a generator which provides additional electricity which is also transmitted to the heat exchanger. The heat producing elements could include fans and/or squirrel cage devices which are driven by electrical power sources. The wind collecting devices could include squirrel cage devices and/or fan devices which are each connected to generators for producing electricity which is then transmitted to the heat exchangers. A system may be comprised of multiple units of each of these devices. Furthermore, the air duct could be straight or it could be curved. While the wind producing devices are driven by conventional electrical power sources, the heat exchangers collect electricity from the wind producing elements which may be unconventional in that the frequency or hertz of the electricity may vary and not be conventional in the sense that it could be different from the common voltage levels and/or frequency, i.e., sixty cycles per second or hertz, which is commonly used in the United States.

17 Claims, 3 Drawing Sheets

SYSTEM FOR GENERATING HEAT USING A WIND TUNNEL

RELATED APPLICATIONS

This application is a Continuation-In-Part of U.S. patent application Ser. No. 11/361,404 filed on Feb. 24, 2006 now abandoned.

BACKGROUND OF THE INVENTION

1. Field of the Invention

The present invention generally relates to systems for heating and, more particular, is concerned with a system that uses a wind tunnel for generating heat which heat is to be used to heat a designated facility.

2. Description of the Prior Art

Systems for generating heat and wind tunnels have been described in the prior art, however, none of the prior art devices disclose the unique features of the present invention.

While these systems for generating heat and wind tunnels may be suitable for the purposes for which they were designed, they would not be as suitable for the purposes of the present invention, as hereinafter described.

SUMMARY OF THE PRESENT INVENTION

The present invention discloses a system for heating air in an enclosed air duct or wind tunnel which comprises a series of wind producing devices which are powered by conventional electrical power sources and a series of wind collecting devices which collect the previously generated wind to generate electricity which electricity is transmitted to a series of heat exchangers. Additionally, wind collecting apparatuses, e.g., a windmill, are provided outside of the air duct to collect wind on the outside of the air duct to drive a generator which provides additional electricity which is also transmitted to the heat exchanger. The heat producing elements could include fans and/or squirrel cage devices which are driven by electrical power sources. The wind collecting devices could include squirrel cage devices and/or fan devices which are each connected to generators for producing electricity which is then transmitted to the heat exchangers. A system may be comprised of multiple units of each of these devices. Furthermore, the air duct could be straight or it could be curved. While the wind producing devices are driven by conventional electrical power sources, the heat exchangers collect electricity from the wind producing elements which may be unconventional in that the frequency or hertz of the electricity may vary and not be conventional in the sense that it could be different from the common voltage levels and/or frequency, i.e., sixty cycles per second or hertz, which is commonly used in the United States.

An object of the present invention is to provide a heating system designed to use energy in an efficient manner to produce heat for a designated facility. A further object of the present invention is to provide a system which is adaptable to various types of facilities by being either linear in design or circular in design. A further object of the present invention is to provide a system which can capture the wind of nature in order to supplement the energy budget of the system of the present invention.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
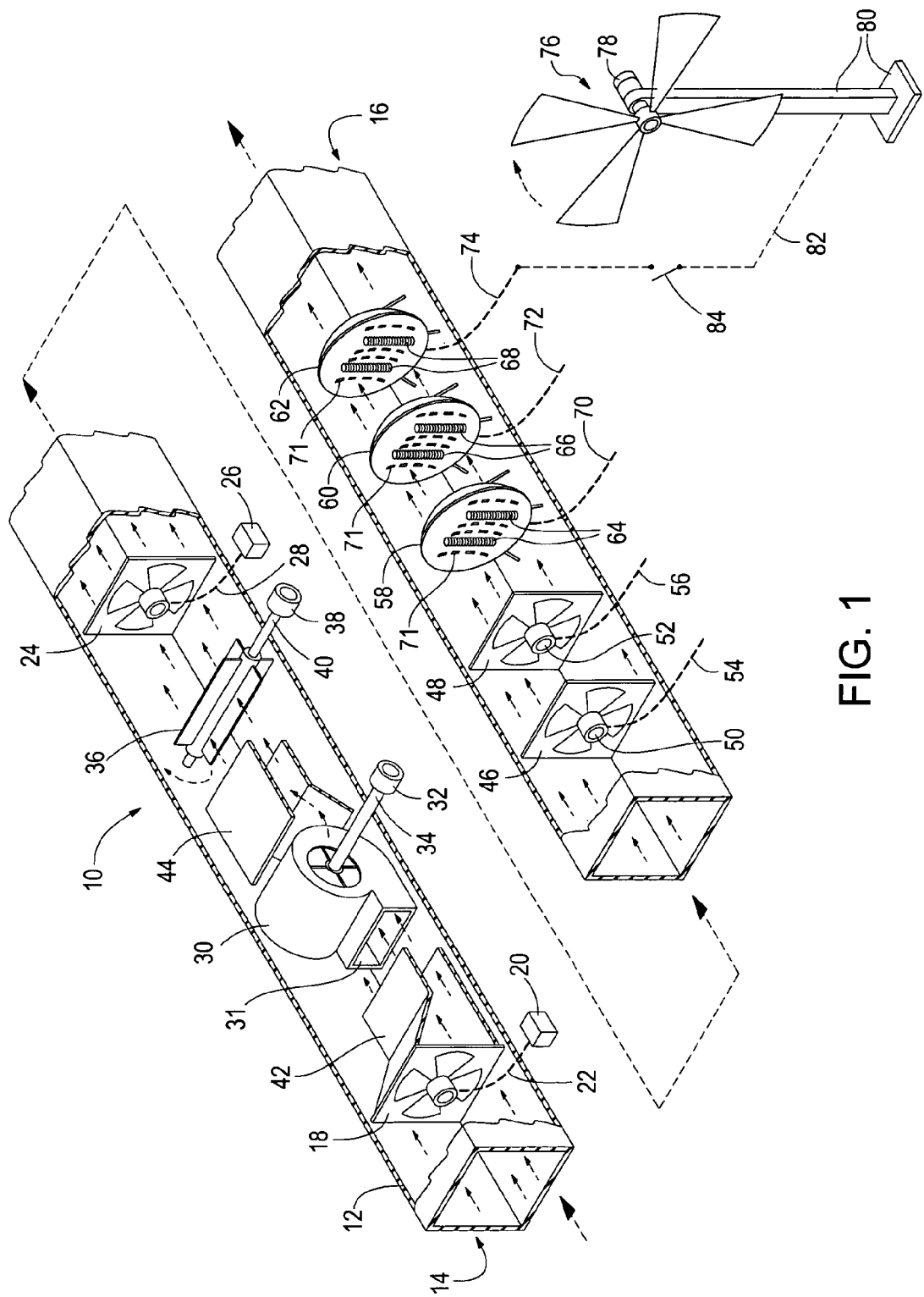
FIG. 1 is a perspective view of one exemplary layout of the present invention.

With regard to reference numerals used, the following numbering is used throughout the drawings.

- 10 present invention
- 12 air duct
- 14 air inlet
- 16 air outlet
- 18 fan wind producing device
- 20 power supply
- 22 electrical connection
- 24 fan wind producing device
- 26 power supply
- 28 electrical connection
- 30 squirrel cage wind collecting device
- 31 inlet
- 32 generator
- 34 shaft
- 36 impeller wind collecting device
- 38 generator
- 40 shaft
- 42 baffle
- 44 baffle
- 46 fan wind collecting device
- 48 fan wind collecting device
- 50 generator
- 52 generator
- 54 electrical connection
- 56 electrical connection
- 58 heat exchanger
- 60 heat exchanger
- 62 heat exchanger
- 64 heating coils
- 66 heating coils
- 68 heating coils
- 71 air duct
- 70 electrical connection
- 72 electrical connection
- 74 electrical connection
- 76 outside windmill
- 78 generator
- 80 support base and structure
- 82 electrical connection
- 84 switch 86 curve
88 curve
90 access hatch
92 seal
94 exhaust fan
96 designated area

DETAILED DESCRIPTION OF THE PREFERRED EMBODIMENT

Figure 2:
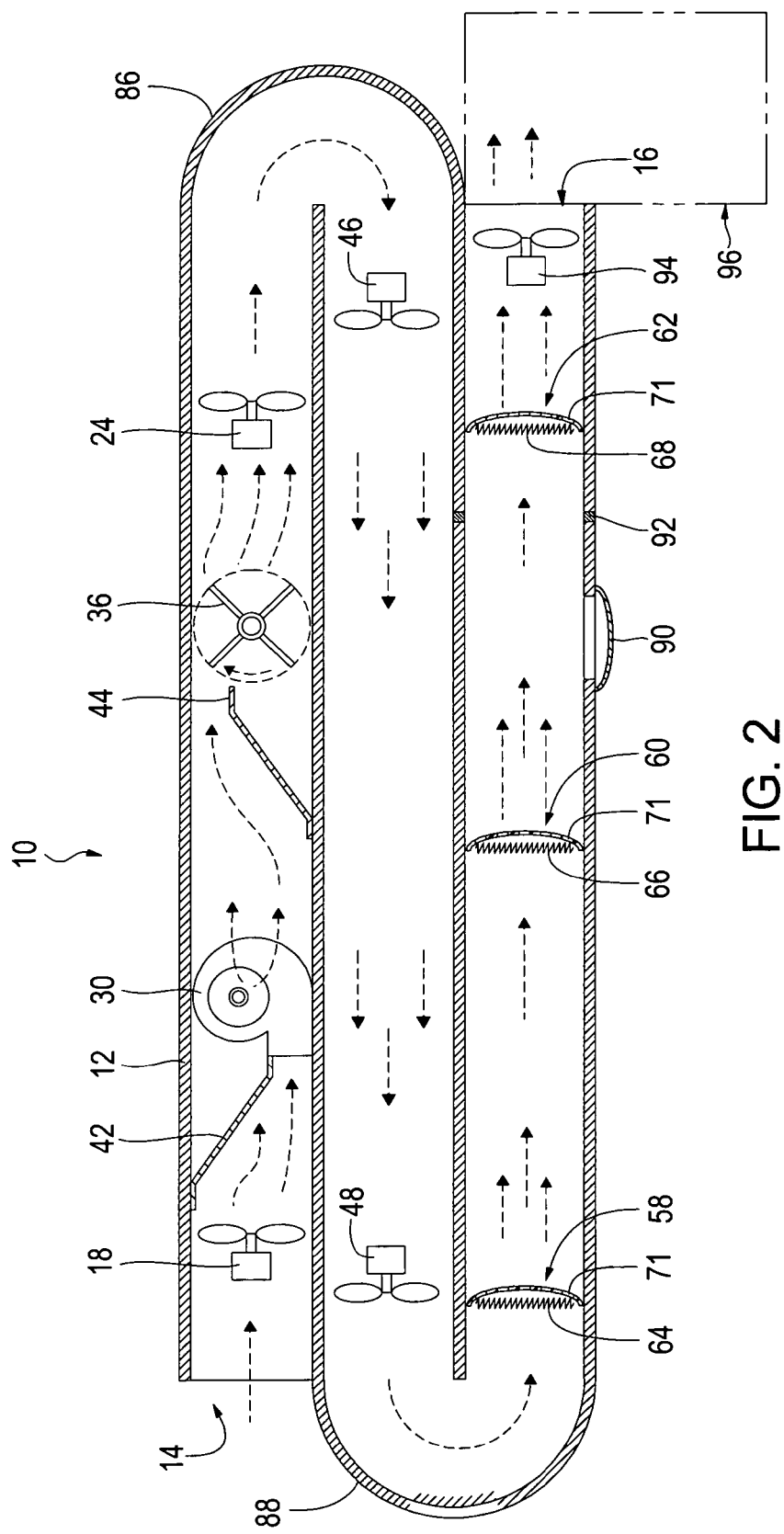
FIG. 2 is a cross-sectional view of one exemplary layout of the present invention.
Figure 3:
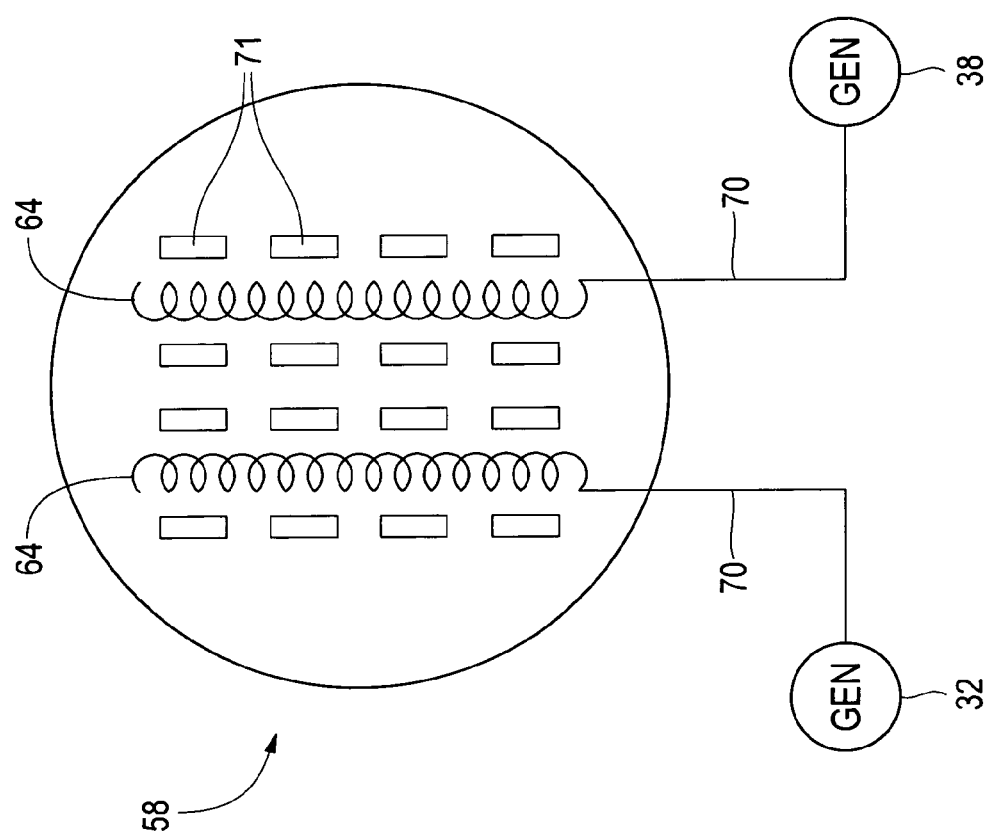
FIG. 3 is an electrical illustration of portions of the present invention.

The following discussion describes in detail the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 to 3 illustrate the present invention wherein a system for heating a facility is disclosed.

Turning to FIG. 1, therein is shown the present invention 10 being a linear or straight air duct 12 wherein air is input at inlet 14 and exhausted from an outlet 16. Air duct 12 is expected to contain at least one and probably a plurality of wind producing and wind collecting devices e.g. fans, squirrel cages, impellers or the like. Shown is wind producing device fan 18 which receives power from external conventional power supply 20 through conventional electrical connections 22. Also shown is a second fan wind producing device 24 and external power supply 26 connected thereto with appropriate electrical connections 28. Also shown is a first wind collecting device in the form of a squirrel cage 30 which drives a generator 32 by means of shaft 34 along with a second wind collecting device in the form of an impeller 36 similarly driving a generator 38 through an axle or shaft 40. Appropriately designed baffles are shown at 42 and 44 wherein the first baffle 42 directs the air downwardly into the inlet 31 of device 30 and baffle 44 directs the air upwardly over the upper portion of impeller 36 so as to move the air as efficiently as possible through air duct 12. Also shown in the air duct 12 are wind collecting devices in the form of fans 46 and 48 each having generators 50 and 52 mounted thereon along with power outlet connections and/or cables 54 and 56. Also shown are multiple heat exchangers 58, 60 and 62, each having at least two heating coils thereon shown at 64, 66 and 68 having electrical wiring 70, 72 and 74. Each of the heat exchanges 58, 60 and 62 have concave shaped collectors or bodies made of non-heat conductive material such as ceramic with the heating elements 64, 66, and 68 disposed inside the cavity of the concave body, wherein each of the heat exchanges has a plurality of air ducts 71 cut entirely through the body which allows the air to move around and through each of the heat exchanges. Also shown is an outside windmill 76 with a generator 78 mounted thereon being mounted on a supporting base and structure 80 in the conventional manner wherein the generator transmits power through appropriate electrical wiring 82 to at least one of the heat exchanges, in this case, heat exchanger 62 through wiring 82, also having at least one switch 84 provided for turning the flow of electricity on or off according to the preference of the user. The fan 18 is disposed an effective distance from the inlet of air duct 12 so that the portion of the air duct between the fan and the inlet acts like an air hood so that 100% of the inlet air is driven toward the outlet 16 of the wind tunnel. The air duct 12 is air tight and sealed at all seams and/or joints so as to be as efficient as possible.

Turning to FIG. 2, therein is shown the present invention 10 in the form of a curved heat duct 12 having an inlet 14 and outlet 16. A first wind producing device 18 in the form of a motor driven fan 18 is shown with baffle 42 directing the flow of air downwardly into the squirrel cage 30 followed by baffle 44 which directs the air upwardly over impeller 36 followed by a second wind producing device 24 wherein the duct 12 then makes a turn through a first curve 86 into a wind collecting device 46 followed by a second wind collecting device 48, wherein the tunnel then makes another turn at turn 88 and is directed into heat exchangers 58, 60 and 62, each of which have a heating coil 64, 66, and 68. Also shown are an exemplary opening and access hatch 90 and an airtight joint seal 92. Also shown near the outlet end 16 of the air duct 12 is an exhaust fan 94 which may be used to aid in moving heated air into the designated area to be heated. Note that the numbering used in FIG. 2 for common elements is consistent with FIG. 1 in order to make it easier for a reader to identify the various components of the present invention 10.

Turning to FIG. 3, therein is shown an exemplary heat exchanger 58, taken from FIG. 1, having two heating coils/ element 64, generators 32 and 38 electrically connected so that one generator goes to one heating coil, and input power lines 70 from each generator to each coil. Heat exchanger 58 is exemplary and could represent any of the heat exchangers 58, 60 or 62 shown in FIG. 1. Multiple air ducts 71 are also shown passing entirely through the shell of the heat exchanger 58. Generators 32, 38 are exemplary and could represent any of the previously disclosed electrical generators 32, 38, 50, 52 or 78 shown in FIG. 1 as chosen by the user.

By way of additional explanation, this present invention provides a wind energy system that provides heat needed to heat a designated area. This is achieved by a system comprised as follows: Initially, wind is mechanically moved through a wind tunnel using wind producing devices. The wind producing devices turn wind collectors which capture the previously produced wind and turn electrical generators mounted thereon all of which are disposed in the tunnel. The electrical generators are directly electrically wired to a heating element mounted in a heat exchanger. The heat exchanger is bowl shaped with the open or concave end of the heat exchangers facing the direction from which the wind is approaching the exchanger. As wind moves through the tunnel, the generators connected to the wind collectors produce electricity and the electricity is dissipated across the heating element and the air flow is heated as the wind moves around the heat exchanger. An external/outside windmill, of various conventional designs, will turn its generator when the outside or ambient wind blows. The outside windmill generators, like the generators in the tunnel, do not have to produce any particular frequency of electricity because the electricity goes directly to the heating element. The heating element is a resistor and will heat when a voltage is applied across it without regard to the frequency of electricity.

It is believed that the present invention provides a system to achieve heat by efficiently using an applied power source and applying the physics of a wind tunnel and the physics of compressing air to create high and low pressures; also the physics of hot air rising and cold air settling down to lower levels is important to the operation of the present invention because these laws allow more efficient use of input energy.

The wind tunnel of the present invention may be made in various shapes. Also, there may be various types of the wind tunnel heating elements, but all wind tunnel heaters use the same method of using the input energy without regards of the size of the heating element. The size of the heating element will be determined by the area of the designated area to be heated.

The wind tunnel of the present invention can be square, round or other shape. The wind tunnel may be straight or curved to fit into the space or facility the heater is to heat. What is critical is that while the heater is operating, there are only two openings; one opening where the wind enters, the intake end, and the other where the wind exits, the exhaust end. The wind tunnels may all have an access panel or panels that are removable giving access to all components inside the tunnel. The access panel or panels are sealed airtight when they are in a closed position during the operation of the heater. The diameter or size of the wind tunnel may also be varied to aid in creating high and low air pressure in the tunnel.

A fan or some other wind producing (wind moving) device is placed at the intake end of the tunnel. All heaters have at least one wind producing device in the tunnel. Depending on the required size of the heater, there will be at least two wind moving devices but no limitation is placed on the number of wind moving devices disposed in the tunnel.

An electrical generator or group of generators connected to wind collecting devices are also in the tunnel and are driven by the wind created in the tunnel by the fans or other wind moving devices that move the air through the tunnel. Windmill and squirrel cage type wind collecting devices may be used by the different designs of the wind tunnel heaters of the present invention.

A heating element is wired directly to each electrical generator in the tunnel so that there is expected to be one element for each generator. As the generated wind moves through the tunnel the electrical generators are turned by the wind collecting devices, creating electricity, and the electricity is applied to the heating element and thereby converted to heat. The heating element is basically a resistor and needs voltage and current to create heat, but the frequency of the electricity need not be any certain value because a resistor will heat without regard to electrical frequency. This is important in the wind tunnel heater of the present invention because wind driven generators are used to produce all heat made by the wind tunnel heater.

The heating elements are mounted in a heat exchanger provided in the present invention. The heat exchanger is non-conductive and non-combustible. The heat exchanger is bowl or concave shaped and when attached inside the tunnel the open end of the bowl faces into the wind that is moving through the tunnel. There may be only one heat exchanger on some designs of the heater of the present invention and several exchangers on other designs. The electricity created in the tunnel is dissipated across the heating elements that are attached to the heat exchangers. This creates heat in and around the heat exchangers and the wind created in the tunnel will then move and exhaust the heat into the area to be heated. The swirling wind in and around the open end of the bowl shaped heat exchanger allows more heat to be absorbed into the air as the air passes the heat exchanger. The heated air then goes out the exhaust end of the wind tunnel and into the area to be heated.

An outside windmill generator may be used on some designs of the wind tunnel heater of the present invention. The outside windmill generator is outside the wind tunnel where the natural wind will turn the windmill when the wind is blowing. There can be more than one outside windmill generator with a wind tunnel heater of the present invention. Like the generators disposed inside of the tunnel, the outside generator is wired directly to a heating element. The element wired to the outside windmill generator is attached to one of the heat exchangers inside the tunnel. This does not increase wind flow in the tunnel but does increase the output of heating element from the heater because more elements will be heated when the outside wind is blowing. The wiring circuit on the outside windmill generator has a switch on it in order to open the circuit when the outside generator is turning and no heat is desired inside the wind tunnel.

The present invention is designed to provide a heating system designed to use energy efficiently to produce heat for a designated area. The tunnel of the present invention is used to keep loss of wind energy to a minimum by having different sizes of tunnels, i.e. the diameter of the tunnel, and preventing the wind from dispersing away to the side so that generated wind must move through the tunnel after crossing the wind collecting devices inside the tunnel.

The present invention may provide windmill-like generators inside the tunnel that create electricity efficiently because of the tunnel effect of the wind in the tunnel. Because of this efficient use of the wind, the heat is created efficiently and the heated air is then moved or transferred to the area to be heated by the same source of wind used by the wind collecting devices so that no additional wind blowers are required to transfer the heated air to the area to be heated.

The electricity created in the tunnel is turned to heat in the tunnel by being applied across the heating elements provided in the present invention.

I claim:

1. An apparatus for heating a designated area comprising:
   a) an air duct having an inlet end and an outlet end, wherein said outlet end is disposed in the designated area to be heated, wherein said air duct is air tight;
   b) a wind producing devise being disposed internal said air duct for moving air from said inlet end to said outlet end;
   c) a wind collecting device being disposed internal said air duct down wind of said wind producing device for capturing wind from said wind producing device;
   d) an electrical generator mounted on and being driven by said wind collecting device for producing electricity, wherein said electricity may have varying frequency and voltage; and,
   e) a heat exchanger being disposed internal said air duct, wherein said heat exchanger has a concave shaped body having a plurality of air slots disposed in said body, wherein said air slots pass entirely through said body so that air can pass through and around said body of said heat exchanger, wherein said concave body is disposed in said air duct so that the opening into said concave body faces up wind, wherein a heating element is disposed in said concave body of said heat exchanger for receiving said electricity from said generator for heating the air in said air duct and the designated area.

2. The apparatus of claim 1, further comprising an external windmill disposed outside of said air duct, wherein said external windmill is disposed so as to capture outside ambient wind, an electrical generator being mounted on and driven by said external windmill for generating electricity, wherein said electricity is transmitted to said heat exchanger disposed in said air duct for producing heat in said air duct, wherein an on/off switch is disposed on said external windmill to control the flow of said electricity from said generator on said external windmill to said heat exchanger.

3. The apparatus of claim 1, further comprising a baffle disposed in said air duct for directing the flow of air in said air duct into said wind collecting device so as to achieve maximum efficiency of air flow and maximum efficiency of operation of said wind collecting device.

4. The apparatus of claim 1, wherein said air duct is straight.

5. The apparatus of claim 1, wherein said air duct is curved.

6. The apparatus of claim 1, further comprising a plurality of said wind producing devices disposed in said air duct.

7. The apparatus of claim 6, further comprising a plurality of said wind collecting devices disposed in said air duct.

8. The apparatus of claim 7, further comprising a plurality of said heat exchangers disposed in said air duct.

9. A method for heating a designated area, comprising the steps of:
   a) providing an air duct having an inlet end and an outlet end, wherein the outlet is disposed in the designated area to be heated, wherein the air duct is air tight;
   b) providing a wind producing device inside the air duct for moving air from the inlet end to the outlet end;
   c) providing a wind collecting device inside the air duct down wind of the wind producing device for capturing wind from the wind producing device;
   d) providing an electrical generator mounted on and being driven by the wind collecting device for producing electricity, wherein the electricity may have varying frequency and voltage; and,
   e) providing a heat exchanger being disposed internal the air duct, wherein the heat exchanger has a concave shaped body having a plurality of air slots disposed in the body, wherein the air slots pass entirely through the body so that air can pass through and around the body of the heat exchanger, wherein the concave body is disposed in the air duct so that the opening into the concave body faces up wind, wherein a heating element is disposed in the concave body of the heat exchanger for receiving electricity from the generator for heating the air in the air duct and the designated area.

10. The method of claim 9, further comprising the steps of providing an external windmill outside of the air duct, wherein the external windmill is disposed so as to capture outside ambient wind, an electrical generator being mounted on and driven by the external windmill for generating electricity, wherein the electricity is transmitted to the heat exchanger disposed in the air duct for producing heat in the air duct, wherein an on/off switch is disposed on the external windmill to control the flow of the electricity from the electrical generator on the external windmill to the heat exchanger.

11. The method of claim 10, further comprising the step of providing a baffle in the air duct for the directing the flow of air in the air duct into the wind collecting device so as to achieve maximum efficiency of air flow and maximum efficiency of operation of the wind collecting device.

12. The method of claim 9, wherein the air duct is straight.

13. The method of claim 9, wherein the air duct is curved.

14. The method of claim 9, wherein a plurality of wind producing devices are disposed in the air duct.

15. The method of claim 14, wherein a plurality of wind collecting devices are disposed in the air duct.

16. The method of claim 15, wherein a plurality of heat exchangers are disposed in the air duct.

17. The method of claim 15, further comprising the step of providing an exhaust fan proximate the outlet end of the air duct for blowing heated air into the designated area to be heated.

* * * * *